Aug. 21, 1951 S. J. EVERETT 2,564,804
NEEDLE MOUNT FOR HYPODERMIC SYRINGES
Filed Feb. 14, 1948
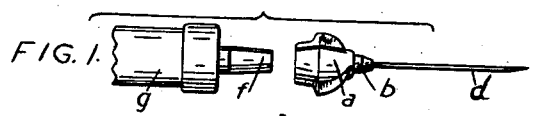
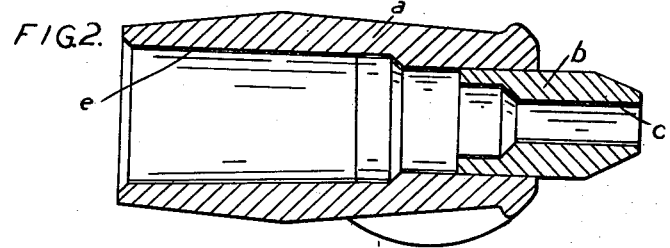
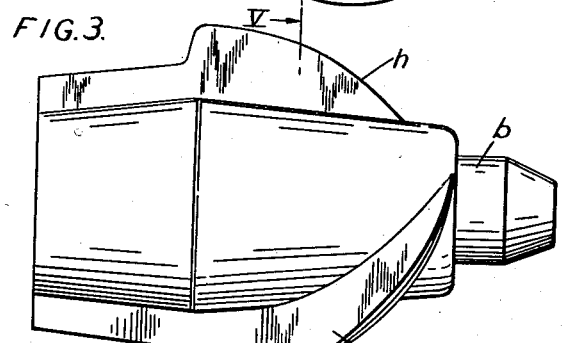
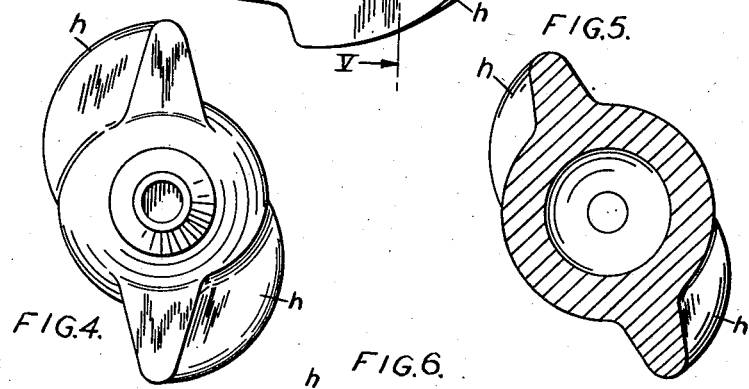
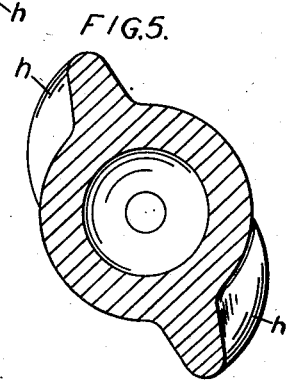
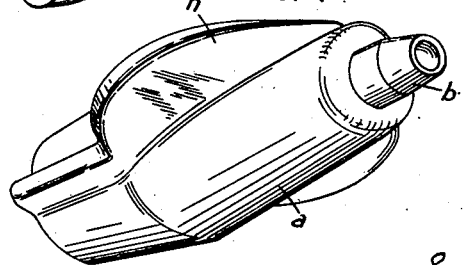
Inventor
Samuel James Everett
By Spears & Spear
Attorney Patented Aug. 21, 1951

2,564,804

UNITED STATES PATENT OFFICE 2,564,804

NEEDLE MOUNT FOR HYPODERMIC SYRINGES

Samuel James Everett, Thornton Heath, England

Application February 14, 1948, Serial No. 8,481
In Great Britain March 24, 1947

6 Claims. (Cl. 128—221)

This invention relates to joining devices and the like wherein male and female elements are engaged by a certain amount of relative axial movement accompanied by manual rotation of one of the elements provided for that purpose with wings or ribs to be gripped by the finger and thumb. Such devices are, for example, employed in plug valves as used for fluids notably in chemical apparatus such as burettes and also as tapered stoppers for the necks of bottles and other containers but they also find application as wing nuts and bolts with continuous quick-action or interrupted threads or cooperating cam surfaces which sometimes take the form of a pin and helical groove. The invention is particularly applicable to cases wherein a certain axial pressure is necessary to effect the initial engagement. One specific application of such jointing devices is to the so-called needle mounts for hypodermic syringes.

In an old form of needle mount, flats were provided on opposite sides to afford a grip on the mount during the fitting of the mount on the nozzle of the syringe. It has, however, been the custom to make an improved form of needle mount with flat longitudinal wings on opposite sides to facilitate the holding of the mount while fitting it on the nozzle and to enable the mount to be pressed at the same time to make it adhere firmly to the nozzle seating. These improved mounts have been fairly effective and are capable of easy production from standard lengths of extruded brass of standard section.

The object of the present invention is to effect a further improvement and to render it easier to regulate the axial pressure necessary for engaging the two elements, in particular, the mount and the nozzle of a hypodermic syringe.

According to the invention, one of the mating elements is provided with wings which are inclined to the axis of the elements and are preferably of helical or approximately helical form. The wings may be sections of left-handed threads so that when the female element is pressed on to the male element and given a twist, axial pressure between the elements is automatically set up at the same time. Conversely, to separate the elements, an opposite twist provides both relative turning of the elements and a separating force along the axis. In the case of a needle mount for a hypodermic syringe, the mount is preferably formed with a pair of opposite helical wings of such a hand that when given a clockwise twist as viewed from the needle end, the axial pressure which is automatically set up forces the elements into engagement and ensures that they remain firmly engaged.

In order that the invention may be clearly understood and readily carried into effect, a preferred embodiment of the invention applied to the needle mount of a hypodermic syringe will now be described in detail with reference to the annexed drawings, in which:

Figure 1 is an elevation showing the nozzle end of the hypodermic syringe with the needle mount in position to be applied to the syringe nozzle;

Figure 2 is an axial section of the needle mount to an enlarged scale;

Figure 3 is a side elevation of the needle mount;

Figure 4 is an elevation of same from the needle end;

Figure 5 is a transverse section on the line V—V in Figure 3; and

Figure 6 is a perspective view of the needle mount.

In the drawings, the needle mount $a$ is formed as a die-casting of metal but may equally be moulded from a synthetic plastic. At the forward end, it is fitted with a turned insert $b$ with a parallel bore $c$ to receive the hypodermic needle $d$. At the rear end, it is furnished with a slightly tapered bore $e$ to receive the tapered nozzle $f$ of the hypodermic syringe $g$.

The body of the needle mount $a$ is formed with a pair of opposite wings or ribs $h$ which in the embodiment illustrated, take the shape of helices or steep left-handed threads integral with the body but they may be separately produced and affixed to the body of the mount $a$. If the mount $a$ in the position shown in Figure 1 is applied to the nozzle $f$ and given a clockwise twist as seen from the right of Figure 1, axial pressure towards the left is automatically applied at the same time so that the mount is firmly bedded on to the nozzle $f$. On the other hand, if the mount is turned in a counterclockwise direction the mount is loosened from the nozzle $b$ by a force automatically exerted from left to right in Figure 1.

It will be appreciated that while in the embodiment illustrated a pair of oppositely disposed wings or ribs is provided, the invention is in no way restricted to that number. Two opposite wings are preferred but any other number such as three or four wings equally spaced around the needle mount may be provided. It will also be easily realized that in the case of a plug valve or bottle stopper the inner or male element may be extended and formed with the wings by which said element is rotated.

I claim:

1. A joining or like device comprising an element formed with a tapered bore, a second element consisting of a tapered plug fitting within said bore and relatively rotatable and axially movable with respect to said first named element and a plurality of wings extending from one of said elements and disposed to be digitally engaged in the rotation of that element and having the form of helical ribs to ensure longitudinal thrust on such rotation.

2. A needle mount for a hypodermic syringe comprising a mount body having a front axial bore to receive a needle and a tapered rear axial portion to fit a syringe nozzle and a plurality of wings extending from said body as fingerpieces for use in rotating said mount to secure it on said syringe nozzle and having the form of helical ribs disposed to ensure longitudinal thrust on said mount on such rotation.

3. A needle mount for a hypodermic syringe, comprising a mount body having a front axial bore to receive a needle and a tapered rear axial portion to fit a syringe nozzle and a pair of wings integral with said body and projecting therefrom on opposite sides as fingerpieces for use in rotating said mount to secure it on said syringe nozzle, said wings having the form of helical ribs disposed to ensure longitudinal thrust on said mount on such rotation.

4. A needle mount for a hypodermic springe, comprising a metal mount body having a front axial bore and a tapered rear axial bore to fit a syringe nozzle, an insert housed within said front axial bore and axially-bored to received a needle and a pair of wings integral with said body and projecting therefrom on opposite sides, said wings having the form of helical ribs.

5. A jointing or like device comprising a smooth-surfaced female element and a smooth-surfaced male element dimensioned to fit said female element when said elements are axially alined and pressed together but requiring both axial pressure and partial relative rotation between said elements to effect a secure interlock therebetween and a plurality of wings extending a substantial distance along one of said elements and inclined relatively to the longitudinal axis thereof with one end of each wing being angularly spaced from the other end thereof about the axis of that element, said wings being in the form of finger pieces for use in effecting said relative rotation and the degree of inclination of their digitally-engageable surfaces being such as to ensure longitudinal pressure between said elements when the same are fitted together and one is turned relatively to the other by means of said wings.

6. A needle mount for a hypodermic syringe comprising a mount body having a front axial bore to receive a needle and a tapered rear axial bore formed with a smooth surface wall to fit a smooth conical syringe nozzle and a plurality of wings extending from said body and angularly spaced around the outer surface thereof with their digitally engageable surfaces being inclined relatively to the longitudinal axis of said body thereby ensuring longitudinal thrust on said body when the same is fitted to a syringe nozzle and turned thereon.

SAMUEL JAMES EVERETT.

REFERENCES CITED

The following references are of record in the file of this patent:

UNITED STATES PATENTS

| Number | Name | Date |
| --- | --- | --- |
| 950,822 | McElroy | Mar. 1, 1910 |
| 1,777,977 | Lente | Oct. 7, 1930 |
| 2,020,111 | Eisele | Nov. 5, 1935 |
| 2,082,868 | Board | June 8, 1937 |
| 2,088,338 | Popper et al. | July 27, 1937 |
| 2,219,089 | Everett | Oct. 22, 1940 |

FOREIGN PATENTS

| Number | Country | Date |
| --- | --- | --- |
| 336,365 | Great Britain | Oct. 16, 1930 |
| 346,134 | Germany | Dec. 24, 1921 |
| 377,754 | Great Britain | Aug. 4, 1932 |